United States Patent [19]

Johansson

[11] 4,319,124

[45] Mar. 9, 1982

[54] MONITORING AND FEEDBACK CONTROLS FOR A SPRAY WELDING APPARATUS

[75] Inventor: Rune L. Johansson, Älvängen, Sweden

[73] Assignee: Thermal Dynamics Corporation, West Lebanon, N.H.

[21] Appl. No.: 123,332

[22] Filed: Feb. 21, 1980

[30] Foreign Application Priority Data

Mar. 1, 1979 [SE] Sweden .............................. 7901872

[51] Int. Cl.³ .............................................. B23K 9/09
[52] U.S. Cl. ........................... 219/130.21; 219/130.51
[58] Field of Search .......... 219/137 PS, 137.2, 137.71, 219/130.1, 130.21, 130.51

[56] References Cited

U.S. PATENT DOCUMENTS 3,809,853  5/1974  Manz .............................. 219/137 PS

*Primary Examiner*—C. C. Shaw
*Attorney, Agent, or Firm*—Sughrue, Mion, Zinn, Macpeak & Seas

[57] ABSTRACT

An apparatus for spray-arc welding includes a controllable current source, means for feeding a wire-like consumable electrode of additive material to the weld location; and a control unit for automatically adjusting the current source in dependence upon the weld sequence. The control unit includes means for dividing the welding sequence in a controlled manner into intervals of high and low mean power, by intermittently increasing and decreasing the output of the welding current source in relation to the average output corresponding to the set rate of feed of said wire-like electrode and to the selected length of the arc; and means for preventing the commencement of a high-power interval before the momentary output voltage has fallen to a given value.

11 Claims, 4 Drawing Figures

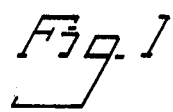
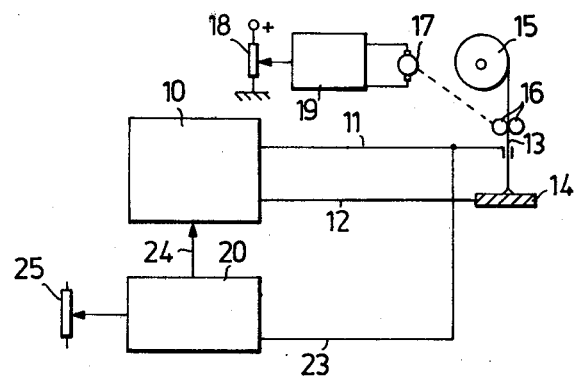
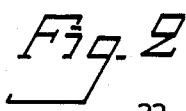
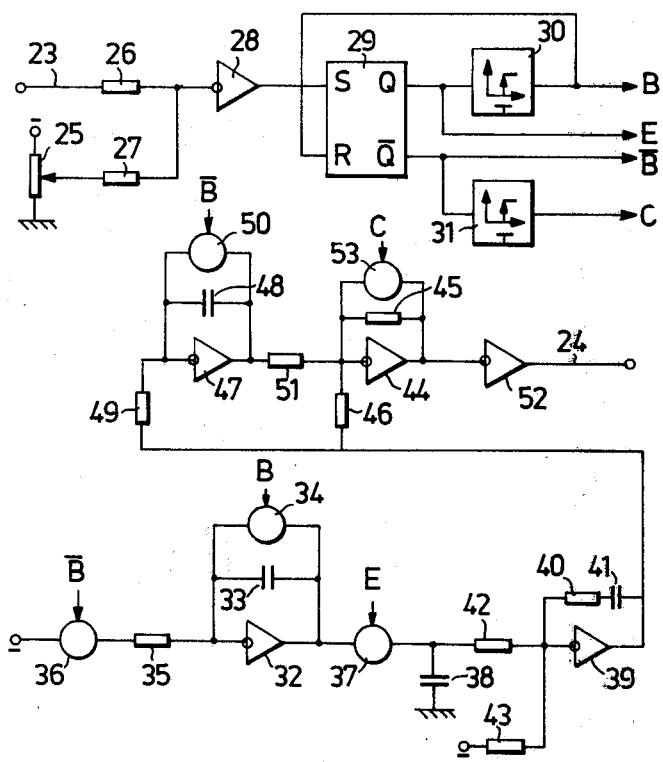

MONITORING AND FEEDBACK CONTROLS FOR A SPRAY WELDING APPARATUS

The present invention relates to an apparatus for spray-arc welding comprising a controllable current source, means for feeding a wire-like consumable electrode of additive material to a weld location, and a control unit for automatically adjusting the current source in dependence upon the welding sequence.

In spray-arc welding, the additive material is supplied in the form of a continuously advanced wire through which the welding current also flows. One characteristic of spray-arc welding is that the additive material is supplied to the weld location in the form of a spray of small droplets, the arc constantly burning between the outermost end of the additive wire and the weld location.

In spray-arc welding apparatus used hitherto, the times at which the supply of the additive material and the supply of current from the current source are stopped must be coordinated with one another in order to prevent the wire-like additive material from contacting the bath of molten weld and subsequently fastening therein, and from being melted within the welding nozzle and subsequently fastening therein. Problems of this nature can also be caused by variations in the feed of said wire-like additive material, for example as a result of slipping in the wire-feed means, and cannot therefore be totally avoided by the aforementioned coordination.

The object of the present invention is to provide a novel and improved apparatus for spray-arc welding, in which the aforementioned problems are at least substantially eliminated.

To this end it is proposed that in an apparatus of the kind described in the introduction the control unit includes means for dividing the welding sequence in a controlled manner into intervals of high and low mean-power by intermittently increasing and decreasing the output of the welding current source in relation to the mean output corresponding to the set rate of wire feed and to the selected arc length, and means for preventing the commencement of a high-power interval before the momentary output voltage has fallen to a given value. In this way it is possible to avoid the aforementioned problems in a simple manner, which problems cannot be avoided with the aid of hitherto known equipment.

If during a low-power interval, the momentary output voltage does not fall to the given value, this is a sign that the speed at which the wire is being fed has fallen considerably and that there is a subsequent risk of the wire becoming stuck to the welding nozzle. To avoid this risk, the control unit, in accordance with an advantageous feature of the invention, may include means for breaking the welding current when the duration of a low-power interval exceeds a given time.

The energy supplied during the high-power intervals can be controlled in many different ways. Preferably, in order to simplify the construction, the duration of the high-power intervals is kept constant. Alternatively, however, the control unit may include means for introducing a further low-power interval when the momentary output voltage of the welding current source reaches a given value. In this respect, the control unit may advantageously include means for controlling the output of the welding current source during the high-power intervals and, optionally, during the low-period intervals as a function of the duration of the high-power intervals. Alternatively, the control unit may comprise means for controlling the output of the welding current source during the high-power intervals and, optionally, also during the low-power intervals as a function of the duration of the low-power intervals.

The invention will now be described in more detail with reference to the accompanying drawings, in which FIG. 1 illustrates very schematically a welding apparatus according to the invention;

FIG. 2 illustrates schematically a preferred embodiment of a control unit incorporated in the welding apparatus according to the invention;

Figure 3:
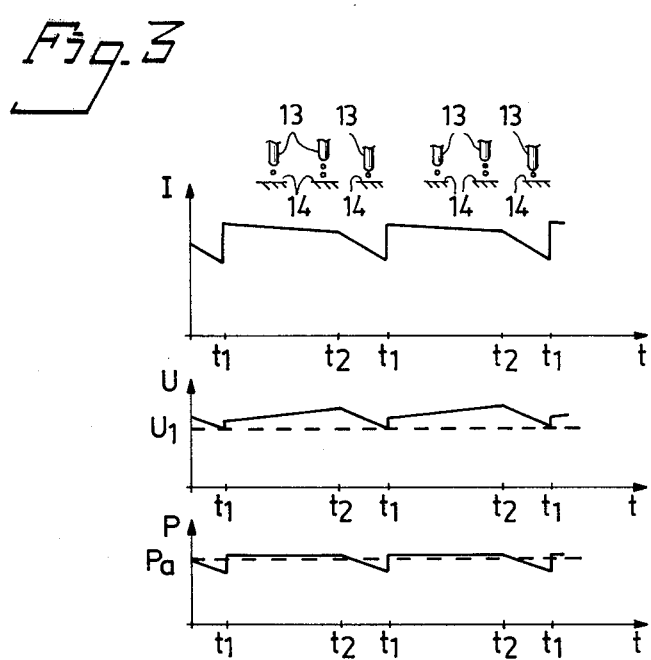
FIG. 3 illustrates normal curves representing current, voltage, and power in a spray-arc welding process using the apparatus according to the invention.

In FIG. 1 there is illustrated a controllable welding current source 10 supplied from a three-phase mains supply, the outputs 11, 12 of which current source are connected to a consumable wire electrode 13 and to a workpiece 14 respectively. The wire 13 is fed to the weld location from a storage reel 15 by means of a pair of feed rollers 16 driven by an electric motor 17 via a control means 18, 19, by means of which the desired rotary speed of the motor and consequently the desired speed at which the wire is to be fed can be manually adjusted in a manner known per se.

The reference 20 generally identifies a control unit, to which signals corresponding to the welding voltage are constantly supplied through a line 23. The reference 24 identifies a line for conducting control signals to the current source 10, which signals in the embodiment hereinafter described control the power output of said current source. The current source is of the quick-controllable type as described in, for example, U.S. Pat. No. 4,152,759 and preferably as described in U.S. Pat. No. 4,159,409 (both assigned to the Assignee herein) and which, consequently, permits individual control of each welding period and also of the different intervals $t_1 - t_2$, $t_2 - t_1$ within each welding period. The reference 25 indicates a manually operated setting means for initially setting the control unit 20.

FIG. 3 illustrates the normal variation of current I, voltage U and power P as a function of the time t when spray-arc welding using the apparatus according to FIG. 1 and the hereinafter described FIG. 2 embodiment. The current, voltage and power normally vary pulsewise or periodically, each welding pulse, as illustrated symbolically above the curves in FIG. 3, where 13 again identifies the consumable wire and 14 identifies the workpiece, illustrates a high-power interval $t_1 - t_2$ and a low-power interval $t_2 - t_1$. The set, desired mean-power level is shown at $P_a$ in FIG. 3.

The control unit illustrated in FIG. 2 receives, over line 23, a voltage signal which coincides with the voltage present between the electrode 13 and the workpiece 14. The voltage signal is applied to a discriminator circuit comprising a voltage divider formed by resistances 26, 27, and an amplifier 28 having an inverted input, said amplifier operating as a level discriminator. The discriminator circuit 26, 27, 28 is arranged to detect a voltage $U_1$ (FIG. 3) on the line 23, said voltage being determined by a negative potential which can be set by means of potentiometer 25 and by resistances 26 and 27. In this way, the amplifier 28 produces a binary "one"-signal when the voltage on the line 23 coincides with or is less than the value $U_1$. The signals from the amplifier 28 are applied to an RS flip-flop or bistable multivibrator as a binary "one"-signal on the S-input. At the beginning of the high-power the latter signal sets the flip-flop in a position in which the output signal E of the Q-output is a binary "one"-signal. Connected to the Q-output of the RS flip-flop 29 is a switch-on time delay circuit 30 which functions in a manner such that when its input signal E passes from a binary "zero"-signal to a binary "one"-signal, the output signal B from the same will make the same signal conversion at a given time after the signal conversion has taken place on the input of circuit 30. The signal B, which at the conversion between a high-power interval and a low-power interval is a "one"-signal of short duration, is applied to the R-input of the RS flip-flop 29 and sets the flip-flop 29 to a position in which the $\overline{Q}$-output delivers a binary "one"-signal. The switch-on time delay circuit 30 determines the duration of the high-power interval $t_1 - t_2$. The $\overline{Q}$-output of the RS flip-flop 29 is referenced $\overline{B}$. The signal $\overline{B}$ is also applied to a switch-on time delay circuit 31, in which it is delayed, the output signal of circuit 31 being referenced C. The mode of operation of the switch-on time delay circuit 31 is the same as that of the previously described switch-on time delay circuit 30.

A signal which is proportional to the duration of the low-power interval is generated by means of an integration amplifier 32, an integration capacitor 33, an electronic switching element 34 which is controlled by the signal B, and an input resistance 35. The input of the integrator circuit 32–35 is coupled to a fixed negative potential through an electronic switching element 36 controlled by the signal $\overline{B}$. During the low-power interval the signal $\overline{B}$ is a binary "one", the element 36 coupling the fixed negative potential to the resistance 35. The output signal from the integration amplifier 32 is then integrated with a constant voltage derivative in the positive sense during the whole of the low-power interval and at the end of said low-power interval is proportional to the duration of said low-power interval. The output signal of the integrator circuit 32–35 is delivered through an electronic switching element 37 controlled by the signal E. The signal E, which is a binary "one" during the high-power interval, couples, during this interval, via the element 37, the output signal from the integrator circuit 32–35 to a large capacitor 38 having a very long discharge-time constant. At the end of the high-power interval, the integration amplifier 32 is set to zero by the switching element 34 through the signal B, which delivers a binary "one" of short duration, at the same time as the switching element 37 is opened by the signal E. Subsequent to each low-power interval, the capacitor 38 will then be charged to a value which is proportional to the duration of a preceding low-power interval.

A regulator for controlling the power output of the current source 10 includes an operational amplifier 39 having a feedback circuit comprising a resistance 40 and an integration capacitor 41, and input resistances 42 and 43. The regulator 39–43 receives a reference signal from a fixed negative potential via the input resistance 43 and a reply signal, via the resistance 42, from the capacitor 38, the voltage of which capacitor is proportional to the duration of the low-power interval. The output signal of the regulator is arranged to control the output of the current source 10 in a manner such that the duration of the low-power interval is controlled to a given value determined by the resistance 43 and the negative potential. This control of the power output is obtained by the fact that the output signal of the regulator 39–43 controls the power reference signal on the line 24 through circuits hereinafter described. During the high-power interval, the power reference signal is generated by a summation circuit including an operational amplifier 44 with its feedback resistance 45 and series resistance 46, the values on the resistances 45, 46 determining the amplification.

During the low-power interval, the output signal delivered by an integrator circuit comprising an operational amplifier 47 with associated integration capacitor 48 and series resistance 49, is subtracted from the power reference signal generated via the resistance 46. The rate of integration of the integrator being determined by the value of the resistance 49 and of the capacitor 48. An electronic switching element 50 controlled by the signal E is connected between the input and output of the amplifier 47 and prevents the amplifier 47 from delivering a signal except during the low-power interval.

Figure 4:
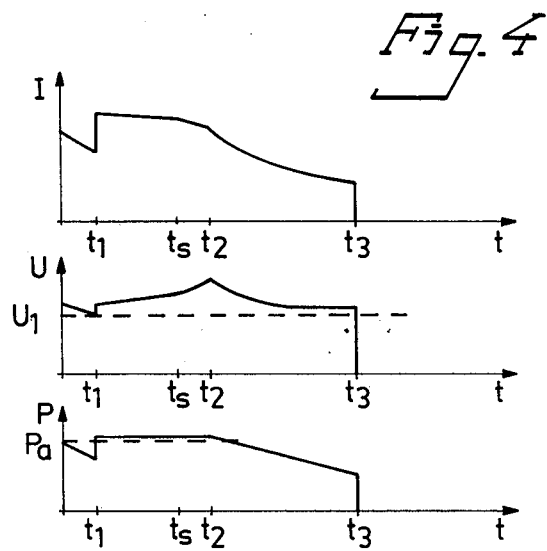
FIG. 4 illustrates curves corresponding to FIG. 3 when feeding of the wire-like additive material is stopped.

The reference signal from the amplifier 47 is subtracted, via the resistance 51 in the summation circuit 44, 45, 46, 51 from the signal previously given through the resistance 46. Thus, the amplifier 44 delivers through an inverting circuit 52 a power reference signal on the line 24 during both the high-power interval and the low-power interval. An electronic switching element 53 controlled by the signal C sets the output signal of the amplifier 44 and circuit 52 to zero if the low-power interval is too long, such long intervals occurring when the feed rate of the consumable wire electrode drops considerably or when the wire feed has stopped altogether. The current and voltage and power sequences which then occur are illustrated in FIG. 4. In FIG. 4, the reference $t_s$ identifies a point in time when feeding of the consumable wire electrode has stopped, while the reference $t_3$ identifies a point in time when the welding current is broken because the duration of the low-power interval has reached its maximum permitted value.

I claim:

1. Apparatus for spray-arc welding, including a controllable current source, means for feeding a wire-like consumable electrode of additive material to a weld location, and a control unit for automatically adjusting the current source, characterized in that the control unit comprises means for dividing the welding sequence in a controlled manner into intervals of high and low mean-power by intermittently increasing and decreasing the output of the welding current source and means for preventing the commencement of a high-power interval before the momentary output voltage has fallen to a given value.

2. An apparatus according to claim 1, characterized in that the control unit comprises means for breaking the welding current when the duration of a low-power interval exceeds a given time.

3. An apparatus according to claim 1, or claim 2, characterized in that the control unit comprises means for maintaining the duration of the high-power intervals constant.

4. An apparatus according to claim 1 or claim 2, characterized in that the control unit comprises means for commencing high-power interval when the momentary output voltage of the welding current source has reached a given value.

5. An apparatus according to claim 4, characterized in that the control unit comprises means for controlling the output of the welding current source during the high-power intervals as a function of the duration of the low-power intervals.

6. An apparatus according claim 5, characterized in that the control unit comprises means for controlling the output of the welding current source during the low-power intervals as a function of the duration of the low-power intervals.

7. Apparatus for spray-arc welding of the type which supplies power to a weld by the application of voltage between a feed wire electrode and a workpiece, comprising:

means for periodically reducing the power applied to the weld; means responsive to the power supplied to the weld for terminating the power reduction period when the power supplied to the weld reaches a predetermined reference level; means for providing a measure of the duration of said power reduction period; comparing means for comparing said measured duration with a reference duration; and control means responsive to said comparing means for adjusting the power to said weld in accordance with the difference between said measured duration and said reference duration in a direction to equalize the measured and reference durations.

8. Apparatus as claimed in claim 7 wherein said means for terminating the power reduction period comprises;

voltage monitoring means for monitoring the voltage supplied to the weld; timing signal generating means responsive to said voltage monitoring means and said predetermined reference level for producing a high-power level duration timing signal of fixed duration and a succeeding low-power level duration timing signal of variable duration, said low-power duration timing signal terminating and said high-power duration timing signal initiating when said monitored voltage equals said reference voltage.

9. Apparatus as claimed in claim 8 wherein said control means for adjusting the power to said weld comprises; amplifier means having a first input supplied by the output of said comparing means.

10. Apparatus as claimed in claim 9 wherein said means for periodically reducing the power applied to said weld comprises; integrater means connected to the output of said comparing means and responsive to said timing signal generating means to be operative only during said low-power level duration timing signal for integrating the output of said comparing means; and means connecting the output of said integrator means to said amplifier means in subtractive relationship with said first input thereto to cause a gradual reduction in power to said weld during said low-power level duration timing signal.

11. Apparatus as claimed in claim 10 further comprising power interrupting means responsive to said low-power level duration timing signal for interrupting the power to said weld if said timing signal exceeds a preset limit.

* * * * *